D. S. KIDDER.
FLY-TRAP.

No. 173,021. Patented Feb. 1, 1876.

WITNESSES:
A. W. Almquist
A. F. Terry

INVENTOR:
D. S. Kidder
BY
Merritt
ATTORNEYS.

N. PETERS, PHOTO-LITHOGRAPHER, WASHINGTON, D. C.

UNITED STATES PATENT OFFICE.

DAVID S. KIDDER, OF TURNER'S FALLS, MASSACHUSETTS, ASSIGNOR TO HIMSELF AND FRANK W. PEABODY, OF SAME PLACE.

IMPROVEMENT IN FLY-TRAPS.

Specification forming part of Letters Patent No. 173,021, dated February 1, 1876; application filed August 28, 1875.

*To all whom it may concern:*

Be it known that I, DAVID S. KIDDER, of Turner's Falls, in the county of Franklin and State of Massachusetts, have invented a new and Improved Fly-Trap, of which the following is a specification:

The invention will first be described in connection with drawing, and then pointed out in the claim.

Figure 1:
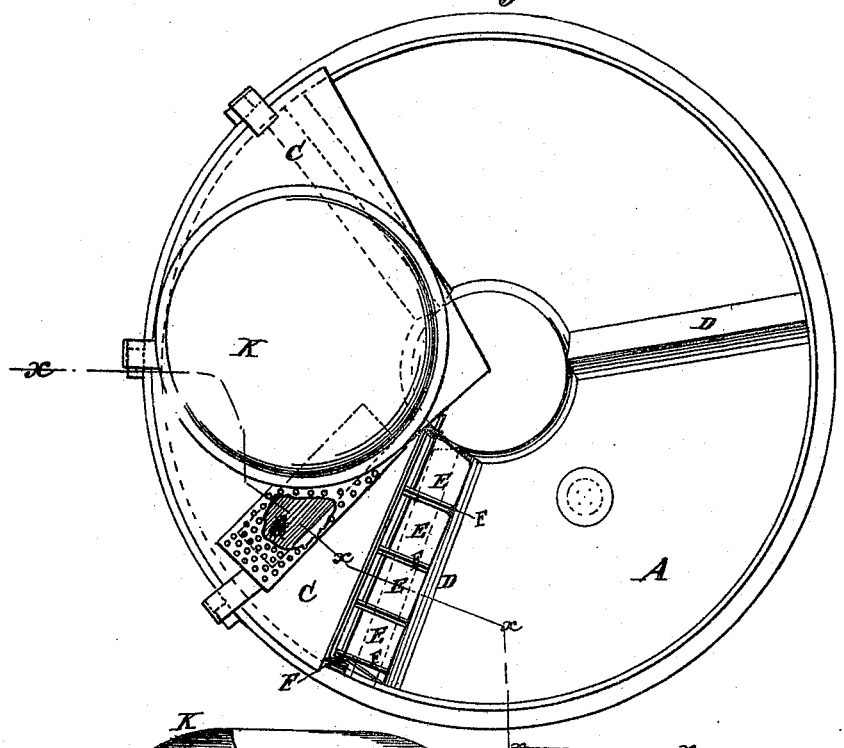
Figure 2:
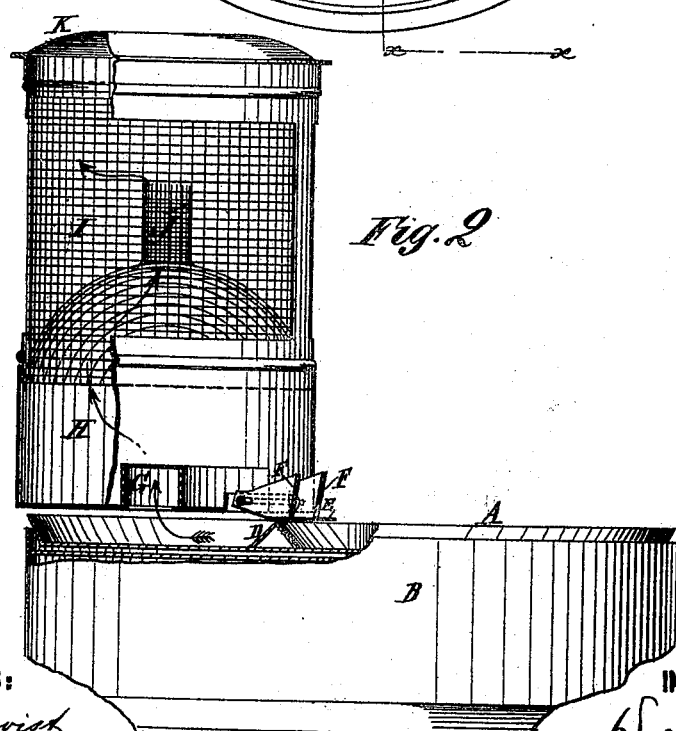

Figure 1 is a plan view of my improved fly-trap. Fig. 2 is a sectional elevation taken on the line $x\ x$ of Fig. 2.

Similar letters of reference indicate corresponding parts.

A represents the revolving pan on a vertical pivot of a case, B, in which clock-work may be arranged to revolve it slowly under the platform C, covering about a quarter of the pan. D represents the radial partitions separating it into three divisions. E represents scrapers or gates hinged to the side of the platform, from which the pan passes to cut off the escape of the flies in that direction, and rising to let the partitions pass, said gates being made in short sections, and having vertical plates F, so that they close progressively and prevent any opening at the outer part of the pan, in consequence of the slower movement of the inner portions of the partitions. Directly behind the gates is a covered way, G, on the platform leading into a light-chamber, H, through which the flies are crowded by the partitions as they advance toward the gates, and over this chamber is another, I, into which they readily pass through an opening in the dome of the lower chamber, and from which they are prevented from returning by the tube J surrounding the opening. In this latter chamber they are to be killed, and then they are to be thrown out of the top when the cover K is taken off.

Having thus described my invention, I claim as new and desire to secure by Letters Patent—

The gates E, constructed in sections and provided with plates F, in combination with the revolving partitioned pan A, substantially as specified.

DAVID S. KIDDER.

Witnesses:
  GEO. S. BARTON,
  FRANCIS W. PEABODY.